United States Patent [19]
Krofchak

[11] Patent Number: 5,593,493
[45] Date of Patent: Jan. 14, 1997

[54] METHOD OF MAKING CONCRETE FROM BASE METAL SMELTER SLAG

[76] Inventor: David Krofchak, 256 Bronte Rd., Oakville, Ontario, Canada, L6L 3C6

[21] Appl. No.: 494,665

[22] Filed: Jun. 26, 1995

[51] Int. Cl.$^6$ ............................ C04B 7/147; C04B 7/153; C04B 7/19
[52] U.S. Cl. ............................ 106/714; 106/789; 106/819
[58] Field of Search .................... 106/714, 737, 106/738, 789, 790, 819

[56] References Cited

U.S. PATENT DOCUMENTS

| | | | |
|---|---|---|---|
| 3,002,843 | 10/1961 | Stöcker | 106/714 |
| 4,306,912 | 12/1981 | Forss | 106/714 |
| 4,761,183 | 8/1988 | Clarke | 106/714 |
| 5,076,851 | 12/1991 | Skovára et al. | 106/714 |
| 5,084,102 | 1/1992 | Brouns et al. | 106/714 |

FOREIGN PATENT DOCUMENTS

| | | | |
|---|---|---|---|
| 963482 | 2/1975 | Canada. | |
| 2077251 | 12/1981 | United Kingdom | 106/714 |

OTHER PUBLICATIONS

Possolanic Properties of Canadian Non–Ferrous Slags E. Douglas et al. Second International Conference Madrid, Spain 1986 Fly Ash, Silica Fume, Slag and Natural Pozzolans In Concrete American Concrete Institute (no month).

*Primary Examiner*—M. L. Bell
*Assistant Examiner*—Michael Marcheschi
*Attorney, Agent, or Firm*—Rogers & Scott

[57] ABSTRACT

A method of making concrete from base metal smelter slag includes grinding the slag to a size within the range of from about −250 to about 425 mesh to produce ground slag cement, mixing the ground slag cement with Type 3 high early strength Portland cement in a ratio of at least about 0.5:1 by weight, and adding sand and stone to produce a concrete.

2 Claims, No Drawings

METHOD OF MAKING CONCRETE FROM BASE METAL SMELTER SLAG

FIELD OF THE INVENTION

This invention relates to the treatment of base metal (copper, nickel, lead or zinc) smelter slag to produce a slag cement for use in making concrete or to produce a by-product of pig iron.

BACKGROUND OF THE INVENTION

The recovery of copper, nickel, lead and zinc from their ores produces over 12 million tons of slag per year. Since 1900, some slags have been used for rail ballast, but usually large slag heaps have accumulated adjacent to the smelters. In recent years, at various mines in Europe and Australia, some smelter slags, usually copper smelter slags, have been ground to about −325 mesh and combined with Portland cement for use in cemented mine backfill, however, the rate of generation of the various slags still exceeds their utilization. No one, so far as is known, has produced high grade concrete for general use in construction work which requires large quantities of ASTM grades of concrete.

During the 1980's, the pozzolanic (cementing properties) properties of Canadian smelter slags were studied to evaluate the feasibility of their use as a partial Portland cement replacement in concrete and mine backfill. It was concluded that these slags could be so used. However, the results were much inferior to those obtained with regular Portland cement, particularly with steel blast furnace slag cement mixtures which only provided approximately 70% of the strength obtained by use of Portland cement and Portland cement/steel mill blast furnace mixtures. Consequently, the work was discontinued, it having also been found that economics and transportation costs were not feasible.

It has now been found that large slag heaps are leaching unacceptably high amounts of heavy metal values, and mining companies are seeking acceptable solutions to this growing problem. Also, environmental authorities are requiring that plans be formulated for long term permanent solutions.

It is an object of this invention to provide a method of using base metal smelter slag to manufacture predictable grades of low, medium and high strength concrete for general construction purposes, including mine backfill that will be equal to or better than that obtained with Portland cement and Portland cement/blast furnace slag mixtures.

A further object of the invention is to provide a method that converts the smelter slag to a slag having similar properties to steel mill blast furnace slag, from which acceptable grades of slag cement can be produced, and which also produce a pig iron by-product.

SUMMARY OF THE INVENTION

According to one aspect of the invention, a method of making concrete from slag produced by a nickel, copper lead or zinc smelter comprises grinding the slag to a size within the range of from about −250 to about 425 mesh to produce ground slag cement, mixing the ground slag cement with Type 3 high early strength Portland cement in a ratio of at least about 0.5:1 by weight, and adding appropriate amounts of sand and stone to produce low, medium or high strength concrete as required.

The ground slag cement may be mixed with the Portland cement in the range of from about 0.5:1 to about 1.5:1 or from about 1.25:1 to about 1.75:1. The ground slag cement may be mixed with the Portland cement in a ratio of up to about 2.5:1 to dispose of extra slag without reducing compressive strength below acceptable ASTM standards.

According to another aspect of the invention, a method of treating base metal smelter slag containing (by weight) from about 15 to about 40% silica ($SiO_2$), from about 35 to about 60% iron oxide ($Fe_2O_3$) from about 2 to about 20% calcium oxide (CaO) from about 1 to about 5% of various other compounds such as MgO, $Na_2O$, $K_2O$, and trace amounts of metal such as Ni, Cu, Pb, Zn, or Co, comprises mixing the slag with sufficient coke as carbon (C) and Limestone ($CaCO_3$), and melting the mixture to produce a calcium silicate slag and pig iron which reports to the bottom of the melt.

The calcium silicate slag may be removed and water chilled to form granules, and the granules then ground to a size within the range of from about −250 to about 425 mesh to produce slag cement.

The mixture may be melted in an existing converter furnace ordinarily used for converting smelter matte to anode metal. The mixture may be melted in a steel maker's blast furnace, a foundry cupola, an electric arc furnace or a basic oxygen furnace.

The slag may be mixed with coke and limestone in proportions of about 1 ton of slag with from about 0.1 to about 0.25 tons of coke and from about 0.75 to about 1.25 tons of limestone.

With the first aspect of the invention, high early strength Portland cement (HESPC) is used. It was found that the HESPC grade works best because it contains more tri-calcium-silicate (60%) than all other grades of Portland cement and has an activating effect on the smelter slag, which is essentially $FeO.SiO_2$ to produce a compound with the formula $3\ CaO.FeO.3SiO_2.3H_2O$ (which is a giant metallic silicate molecule).

It has been discovered that base metal smelter slags can be made to perform in this manner only using HESPC and produce equal or stronger concrete than the regular use of ordinary Portland cement with steel making blast furnace slag cement.

With the second aspect of the invention, a suitable furnace may be used to remelt the slag with coke and limestone to produce the following chemical reaction: (among others)

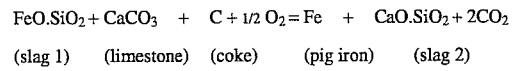

(slag 1)   (limestone)   (coke)       (pig iron)   (slag 2)

Slag 1 is the smelter slag.

Slag 2 is the new slag (calcium silicate), which is similar to steel making blast furnace slag.

The new slag may be ground to −250 to 425 mesh and used as slag cement, and the pig iron may be sold to steel manufacturers. Such utilization of base metal smelter slags to produce slag cement, and in some cases pig iron, is to completely solve the environmental leach problem of heavy metals while at the same time providing a viable and practical use for the slag. The prior art teaches that tying up heavy metals as metallic silicates renders them totally insoluble in water and thereby non-leachable since Portland cement contains tri-calcium aluminium silicate which reacts with these materials. With the present invention, this is automatically accomplished while simultaneously making concrete.

Various examples of methods carried out in accordance with the present invention will now be described.

EXAMPLE 1

A composite sample of slag was obtained from a slag heap which has been accumulated over 50 years from one of the world's largest nickel producers located in Sudbury, Ontario, Canada. The sample was ground to −325 mesh and was analysed as follows: (by weight)

| | | | |
|---|---|---|---|
| $SiO_2$ | 35.66% | $TiO_2$ | 0.32% |
| $Al_2O_3$ | 5.59% | MnO | 0.07% |
| $Fe_2O_3$ | 53.00% | Co | 0.20% |
| CaO | 2.75% | Cu | 0.20% |
| MgO | 2.53% | Ni | 0.40% |
| $Na_2O$ | 0.87% | S | 1.46% |
| $K_2O$ | 0.65% | | |

The specific gravity was 3.67 (the specific gravity of Portland cement being about 2.75). Since the American Society for Test Materials (ASTM) has established a procedure for evaluating acceptable quality standards for slag cements for use in concrete and mortars (C989), this procedure has been followed so that the results conform to standards of acceptance in the concrete industry. The procedure calls for 2" cubes to be made using graded sand and cement as a reference sample, and identical cubes made with graded sand and a 50/50 mixture of cement and the proposed new slag cement.

For the slag cement to meet ASTM standards, the following slag activity index is calculated:

$$\frac{\text{Slag Cube Strength}}{\text{Reference Cube Strength}} \times 100 \geq 70\%$$

Compressive Strength Test

| | Mix Proportions | | | | Compressive Strength, psi | |
|---|---|---|---|---|---|---|
| | Cement | Sand | Slag | Water | 7 day | 28 day |
| | gm | gm | gm | gm | | |
| Control | 500 | 1375 | — | 250 | 4050 | 5470 |
| Slag | 250 | 1375 | 375 | 250 | 5250 | 5900 |

From these results it is clear that the cubes made with the smelter slag were stronger than the Portland cement reference control cube, far exceeding the minimum 70% requirement to meet ASTM standards for use in concrete and mortars. The cement was Type 1 for the control and Type 3 for the slag cement cube.

EXAMPLE 2

More random samples of slag were selected from the slag heap and again ground to −325 mesh, and the test in Example 1 repeated in all respects except that the control cube in example 1 was accepted as a standard control for this test.

The results were: 6080 psi at 7 days and 7050 psi at 28 days. Again, this far exceeds the ASTM requirements and shows that this invention is technically very successful.

EXAMPLE 3

This example is more complex than examples 1 and 2 because the smelter slag is processed pyrometallurgically to reduce and remove iron and replace it with calcium to produce a calcium silicate slag from an iron silicate slag and at the same time produce pig iron.

To fully understand the generality of this process, it is informative to note the similarity of nickel, copper, lead and zinc slags with respect to their constituents as follows:

| | Approximate Analysis in (%) | | |
|---|---|---|---|
| | Nickel Slag | Copper Slag | Lead, Zinc Slag |
| $SiO_2$ | 36 | 35 | 19 |
| $Al_2O_3$ | 6 | 7 | 2 |
| $Fe_2O_3$ | 49 | 53 | 45 |
| CaO | 3 | 2 | 17 |
| MgO | 1 | 3 | 1 |
| $Na_2O$ | 1 | 1 | 0.3 |
| $K_2O$ | 1 | 1 | 0.3 |

From the above analysis, it will be noted that the main constituents in each case are $SiO_2$ and $Fe_2O_3$ and, for those experienced in geology and mining, it will be realized that these slags are, "by accident" rather than "by design", synthetic low grade iron ores. High grade iron ore is usually about 80% $Fe_2O_3$ and about 20% $SiO_2$. Steel mills would not use the low grade smelter slags because of the low iron and high silica ($SiO_2$) which would produce unacceptable amounts of slag. However, if there was a desirable and economical reason to produce slag at the smelter site for use as slag cement for mine backfill and production of concrete in the area, this would be adequate justification to carry out this method.

This method involves a furnace type, the nature of which will be readily apparent to a person skilled in the art, which is charged with smelter slag in lumps together with the appropriate amounts of limestone and coke in accordance with the following formula:

$FeO.SiO_2 + CaCO_3 \ + \ C + 1/2O_2 = Fe \ + Ca.O.SiO_2 + 2CO_2$ (slag)    (limestone)    (coke)    (iron)    (slag)

Following this equation, a crucible was charged with:
240 grams slag
178 grams limestone
22 grams coke These quantities conform to the chemical equation stoichiometrically shown above. The crucible was placed into a small propane heated furnace and melted. The crucible and contents were quench cooled in water and broken apart. A button of metal was found and analysed as follows: Fe=99%, Ni=0.42%, Cu=0.26% and Co=0.246%

The slag was ground to −325 mesh and test cubes made as Example 1 in accordance with ASTM standards produced a compressive strength of 90% of the strength of the control sample in Example 1. Since the acceptable standard is 70% of the control, the results are acceptable.

EXAMPLE 4

Proving this invention required producing 2" test cubes of the concrete in accordance with ASTM standards. Since the various strength tests destroy the cubes, it is essential to produce enough cubes from each test batch to be consumed in the tests and still leave at least one left over for long term observation and as a record. Thus, 6 cubes were made for each test and at least 7 tests were made producing 42 cubes. In this example, the durability of a concrete cube in Example 1 is examined with respect to its durability in "freeze/thaw" conditions which are particularly important in cold climates such as Northern Canada.

A 2" cube was placed in a freezer at −20° C., removed daily and immersed in water at 21° C. and replaced in the freezer 12 hours later, ie: thawed in water during the day and frozen in the freezer over night. This procedure was continued in accordance with ASTM test method C666 which calls for 300 freeze/thaw cycles. This was done and it was observed that the concrete cube had no damage such as spalling of the surfaces, thus demonstrating that the smelter slag produced concrete which has good durability to resist exposure conditions which are the most destructive factors that cause deterioration in concrete.

EXAMPLE 5

The unfortunate problem now facing base metal smelters all over the world is the growing piles of slag which authorities have now determined leach unacceptable values of heavy metals such as nickel, copper, lead, zinc, etc. Prior art, and in particular U.S. Pat. No. 4,110,212 (Krofchak), teaches that silica compounds such as tri-calcium-aluminium silicate (Portland cement) tie up heavy metals as insoluble silicates which stop them from leaching. In this example, ground slag was leached in water/acid in accordance with Environment Protection Agency (EPA) test standards, and was found to leach unacceptable amounts of heavy metals as follows:

| Metals | Leach, ppm | EPA Standard, ppm |
| --- | --- | --- |
| Ni | 10 | 5 |
| Cu | 20 | 5 |
| Fe | 45 | 5 |

However, a concrete cube from Example 1 which had been crushed for a compression test was leached under the same conditions and no detectable amounts of Ni, Cu or Fe were found, proving that the Portland cement/concrete had tied up the heavy metals in such a manner that they did not leach and therefore met regulation standards.

EXAMPLE 6

A series of 2" concrete cubes were made using the same amount of Portland cement type 3, but varying the amount of smelter slag as follows:

| | Mix Proportions in grams | | | Compressive Strength, psi | |
| --- | --- | --- | --- | --- | --- |
| Cube | Cement | Sand | Slag | 7 day | 28 day |
| A | 125 | 1375 | 375 | 2950 | 4840 |
| B | 250 | 1375 | 250 | 3650 | 4800 |
| C | 250 | 1375 | 375 | 6080 | 7050 |
| D | 250 | 1375 | 500 | 5420 | 6130 |

From these results it can be seen that:

i) The highest strength was cube C, having a ratio of slag cement:

$$\text{Portland cement of } \frac{375}{250} = 1.5 \text{ or a ratio of } 1.5{:}1$$

ii) reducing the ratio of slag cement reduced the strength as in cube B. However, increasing the ratio as in A and D cubes also reduced the strength but still made acceptable concrete in accordance with prescribed standards.

The purpose of this experiment was to demonstrate the major advancement of the invention over any prior art in establishing the optimum ratio of slag cement to Portland cement. It also shows that considerable excess smelter slag cement can be added to the mix, thereby providing an increased opportunity for "disposal" of slag in a safe manner without seriously impairing the compressive strength below ASTM standards.

Numerous other experiments have been conducted using varying amounts of Portland cement/smelter slag/sand mixtures and have produced satisfactory results but, more particularly, the method according to this invention has advantageously made use of the smelter slag to make high strength concrete superior to regular Portland cement concrete, while simultaneously solving a growing and perplexing environmental problem. Thus, an economical and viable solution has been invented for the disposal or recycling of a waste material into a valuable raw material from which important and increasingly useful products can be made, namely concrete and pig iron.

Other embodiments of the invention will be readily apparent to a person skilled in the art, the scope of the invention being defined in the appended claims.

I claim:

1. A method of making concrete from base metal smelter slag produced by a nickel, copper, lead or zinc smelter, said slag containing (by weight) from about 15 to about 40% silica ($SiO_2$), from about 35 to about 60% iron oxide ($Fe_2O_3$), and from about 2 to about 20% calcium oxide (CaO), comprising:

grinding the slag to a size within the range of from about −250 to about 425 mesh to produce ground slag cement, mixing the ground slag cement with Type 3 high early strength Portland cement in a ratio of from about 1.25:1 to about 1.75:1 by weight, and adding sand and stone to produce a concrete.

2. A method of making concrete from base metal smelter slag produced by a nickel, copper, lead or zinc smelter, said slag containing (by weight) from about 15 to about 40% silica ($SiO_2$), from about 35 to about 60% iron oxide ($Fe_2O_3$), and from about 2 to about 20% calcium oxide (CaO), comprising:

grinding the slag to a size within the range of from about −250 to about 425 mesh to produce ground slag cement, mixing the ground slag cement with Type 3 high early strength Portland cement in a ratio of at least about 1.25:1 and up to about 2.5:1 by weight, and adding sand and stone to produce a concrete.

* * * * *